United States Patent
Okada

(10) Patent No.: US 8,054,173 B2
(45) Date of Patent: Nov. 8, 2011

(54) ALARM MANAGEMENT DEVICE

(75) Inventor: Satoshi Okada, Musashino (JP)

(73) Assignee: Yokogawa Electric Corporation, Musashino-shi (JP)

( * ) Notice: Subject to any disclaimer, the term of this patent is extended or adjusted under 35 U.S.C. 154(b) by 407 days.

(21) Appl. No.: 12/464,546

(22) Filed: May 12, 2009

(65) Prior Publication Data

US 2010/0019894 A1 Jan. 28, 2010

(30) Foreign Application Priority Data

Jul. 25, 2008 (JP) ................................. 2008-191606

(51) Int. Cl.
G08B 29/00 (2006.01)
G05B 15/00 (2006.01)

(52) U.S. Cl. ............ 340/506; 340/525; 700/12; 700/79; 700/83

(58) Field of Classification Search .................... 340/506
See application file for complete search history.

(56) References Cited

U.S. PATENT DOCUMENTS 5,581,242 A * 12/1996 Arita et al. ................. 340/691.6

FOREIGN PATENT DOCUMENTS

| JP | 05-054280 A | 3/1993 |
|---|---|---|
| JP | 09-016875 A | 1/1997 |
| JP | 10-027290 A | 1/1998 |
| JP | 2003-186536 A | 7/2003 |
| JP | 2005-084774 A | 3/2005 |

OTHER PUBLICATIONS

Japanese Office Action dated Apr. 7, 2011, issued in corresponding Japanese Patent Application No. 2008-191606.
Japanese Office Action dated Oct. 14, 2010, issued in corresponding Japanese Patent Application No. 2008-191606.

* cited by examiner

*Primary Examiner* — Donnie Crosland
(74) *Attorney, Agent, or Firm* — Westerman, Hattori, Daniels & Adrian, LLP

(57) ABSTRACT

An alarm management device capable of constructing logics for suppressing tailgate alarm without depending on controllers, and of managing engineering and management thereof with concentration. The invention relates to an alarm management device for managing alarms issued in a plant. The alarm management device is provided with alarm state management apparatus for managing issuance states of acquired alarms, alarm engineering apparatus for setting alarm issuance patterns, alarm suppression judgment apparatus for judging suppression target alarms from the alarm issuance states and alarm issuance patterns, and alarm processing apparatus for executing suppression of the suppression target alarms among the acquired alarms in response to an instruction of the alarm suppression judgment apparatus.

5 Claims, 6 Drawing Sheets

FIG. 3

| ALARM GROUP | ALARM | TRIGGER |
|---|---|---|
| GROUP-A | FIC100. LL | Yes |
| | FIC200. LO | |
| | FIC200. LL | |
| | FIC300. LO | |
| | FIC300. LL | |
| | FIC400. LO | |
| | FIC400. LL | |
| GROUP-B | FICA00. LL | Yes |
| | FICB00. LO | |
| | FICB00. LL | |
| | FICC00. LO | |
| | FICC00. LL | |
| | FICD00. LO | |
| | FICD00. LL | |

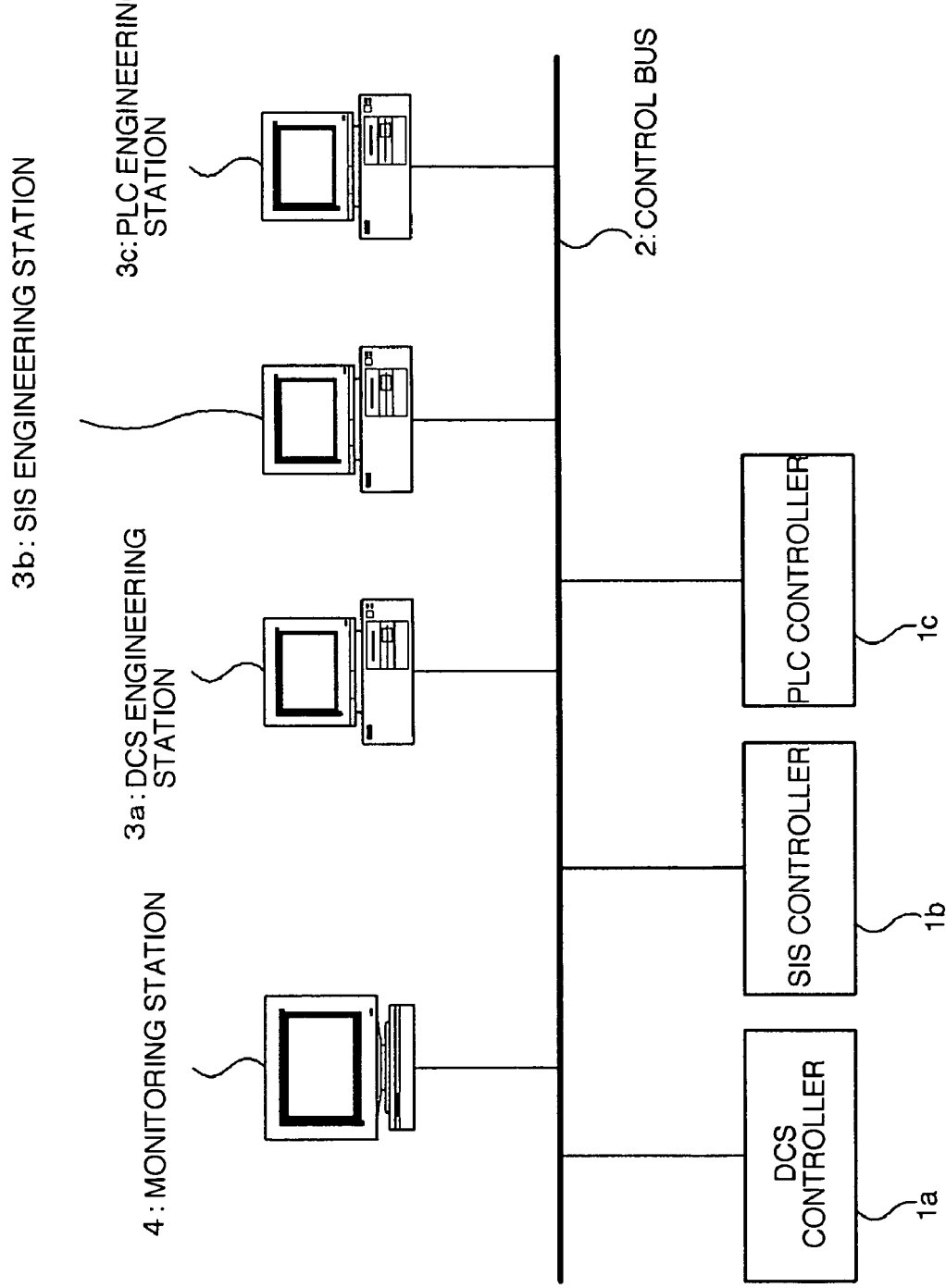
FIG. 6 (PRIOIR ART)

ALARM MANAGEMENT DEVICE

FIELD OF THE INVENTION

The invention relates to an alarm management device for managing alarms issued in a plant, and particularly to an alarm suppression function for suppressing unnecessary alarm messages.

BACKGROUND OF THE INVENTION

There has been conventionally continuous issuance of a multitude of alarms from field equipment, a distributed control system (DCS), and so forth, whereby a screen for monitoring alarm messages is filled with alarm messages, to be rendered in a so-called alarm flood state, thereby contributing to oversight of an important alarm or erroneous judgment by a plant operator. To that end, it is required to suppress the notification of alarms to the operator in response to states of the plant and operation situations.

Consequently, even if a multitude of alarms are issued, there has been executed an alarm management wherein only necessary alarms are notified to the operator at the optimum time by making a choice of information.

There is a dynamic alarm suppression method as one of alarm suppression methods. If an alarm is issued in a plant due to the occurrence of anomalies at some spots in the plant, it secondarily triggers anomalies at other spots in the plant, causing the issuance of a tailgate alarm. For example, if flow anomalies occur at upstream, it causes flow anomalies to occur at downstream.

In such a case, it is possible to ease strain on the operator by notifying only a triggered first alarm to the operator and suppressing a secondary tailgate alarm so as to be eliminated from a watch list.

FIG. 6 is a view for explaining conventional alarm suppression.

A DCS controller 1a, a safety instrumented system (SIS) controller 1b and a PLC controller 1c are connected to a control bus 2, respectively. A DCS engineering station 3a, an SIS engineering station 3b and a PLC engineering station 3c, each provided for a plant engineer to execute engineering for every DCS controller 1a, SIS controller 1b and PLC controller 1c, are connected to the control bus 2, respectively. Situations of the plant are monitored by a plant operator in a monitoring station 4 connected to the control bus 2.

The conventional suppression of a tailgate alarm (hereinafter referred to as tailgate alarm suppression) is executed as detection logics for every DCS controller 1a, SIS controller 1b and PLC controller 1c. For example, in case the tailgate alarm of the field equipment connected to the DCS controller 1a is to be suppressed, the plant engineer executes engineering relative to the DCS controller 1a through the DCS engineering station 3a, or constructs logics so that the tailgate alarm, that is secondarily issued while triggered by the issuance of some alarm, is not notified.

[Patent Document 1] JP2003-186536A

According to the conventional tailgate alarm suppression, it is necessary to construct logics for executing suppression for every kind of controller and for every device, leading to difficulty in engineering.

Further, if there occurs errors in constructed logics, there is the possibility of exerting an influence upon the operation of the controllers.

Still further, since the logics are constructed for executing the tailgate alarm suppression for every controller, there was a problem in that an alarm, that is issued while extended over the controllers, can not be suppressed.

SUMMARY OF THE INVENTION

The invention has been developed to solve the foregoing problems and it is an object of the invention to achieve an alarm management device capable of constructing logics for suppressing a tailgate alarm without depending on controllers, and of managing engineering and execution thereof with concentration.

To achieve the above object, the invention is configured as follows.

(1) The alarm management device for managing alarms issued in a plant comprises alarm state management means for managing issuance states of acquired alarms, alarm engineering means for setting alarm issuance patterns, alarm suppression judgment means for judging alarms to be subjected to suppression (hereinafter referred to suppression target alarms) from the alarm issuance states and alarm issuance patterns, and alarm processing means for executing suppression of the suppression target alarms among the acquired alarms in response to an instruction of the alarm suppression judgment means.

(2) The alarm management device according to the above item (1), wherein the alarm issuance patterns group alarms that are associated with each other in causes of issuance and specifies an alarm serving as a source of causes as a suppression condition.

(3) The alarm management device according to the above item (2), wherein the alarm suppression judgment means monitors alarm issuance states managed by the alarm state management means, and causes alarms other than an alarm satisfying the suppression condition among the alarms of a group belonged to the suppression condition to be the suppression target alarms when the alarm satisfying the suppression condition is issued.

(4) The alarm management device according to any one of the above items (1) to (3), wherein the alarm suppression judgment means monitors alarm issuance states managed by the alarm state management means, and instructs cancellation of the suppression of suppression target alarms when the suppression target alarms are not issued on schedule.

(5) The alarm management device according to any one of the above items (1) to (4), wherein the alarm processing means monitors processing states of the plant, and suppresses the suppression target alarms in response to the instruction of the alarm suppression judgment means when the processing states satisfy prescribed conditions.

According to the invention, there are following effects. That is, logics for executing tailgate alarm suppression can be constructed without depending on controllers, and engineering and execution thereof can be managed with concentration.

BRIEF DESCRIPTION OF THE DRAWINGS

FIG. 3 is a view for explaining examples of the tailgate alarms;

FIG. 6 is a view for explaining conventional alarm suppression.

PREFERRED EMBODIMENT OF THE INVENTION

The invention is now described in detail with reference to the attached drawings.

Figure 1:
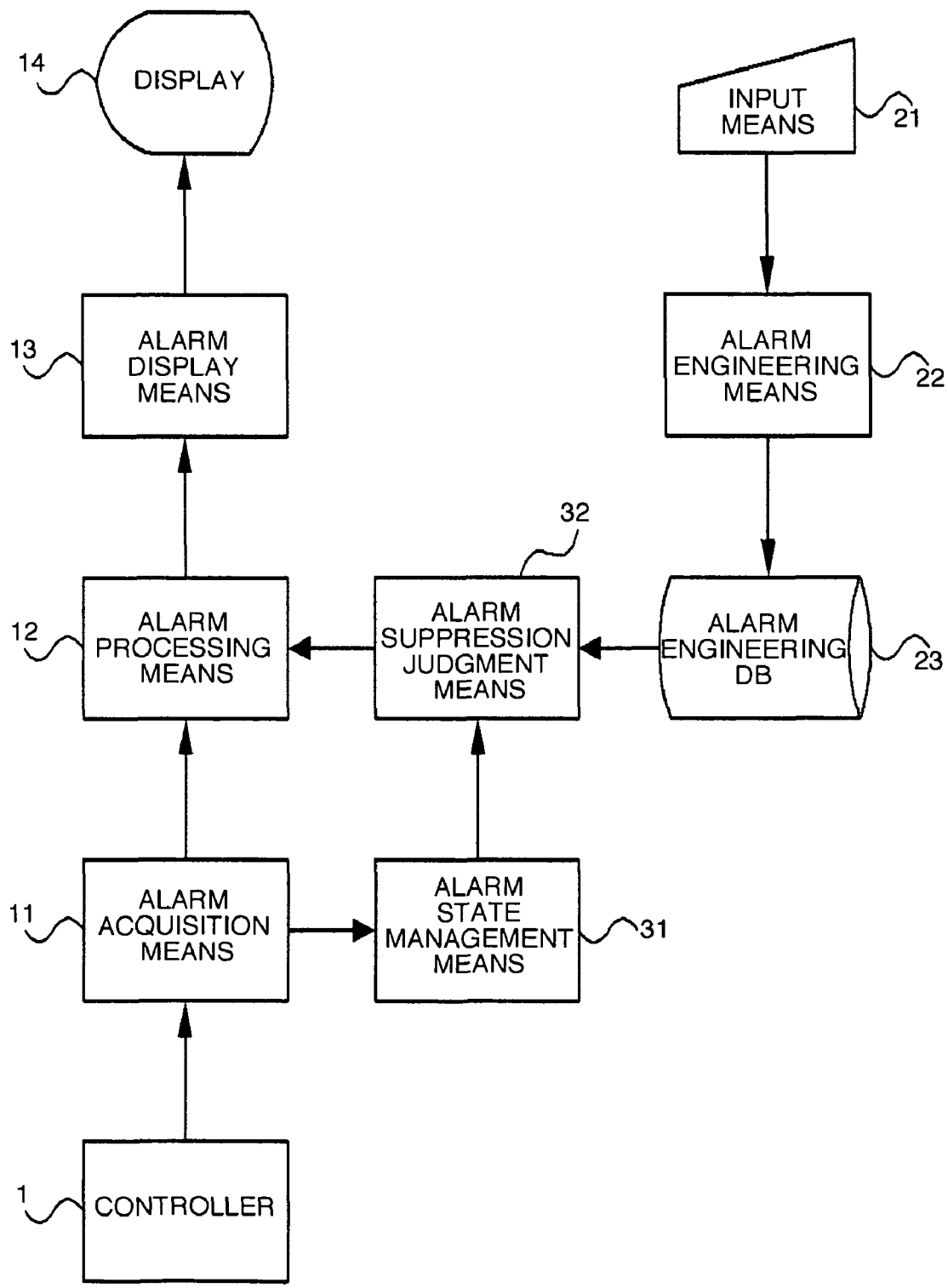
FIG. 1 is a configuration diagram showing one embodiment of the invention.

FIG. 1 is a configuration diagram showing one embodiment of the invention.

A controller 1 corresponds to the DCS controller 1a, the SIS controller 1b and the PLC controller 1c as shown in FIG. 6 and executes control of field equipment and so forth (not shown).

An alarm acquisition means 11 receives alarms or evens of the field equipment and so forth disposed in a plant from the controller 1.

An alarm processing means 12 executes processing such as an addition of value-added information, alarm suppression, and so on relative to the alarms or events received by the alarm acquisition means 11. The addition of value-added information is a function to add causes of alarm activation to be assumed, responses to be taken, information to be monitored together, and so forth to the alarms or events. The result of processing by the alarm processing means 12 is conveyed to an alarm display means 13, and alarms or event information are displayed on a display 14 by the display processing by the alarm display means 13.

A plant operator or a plant engineer operates an alarm engineering means 22 via an input means 21. The alarm engineering means 22 is a means for setting alarm issuance patterns. The alarm issuance patterns set by the alarm engineering means 22 group alarms that are associated with each other in causes of issuance, and specifying an alarm serving as a source of causes as an alarm suppression condition. The alarm issuance patterns that are set by the alarm engineering means 22 are stored as a data base (DB) in an alarm engineering DB 23.

An alarm state management means 31 manages alarm issuance states for every alarms acquired by the alarm acquisition means 11. The alarm issuance states are levels such as an HI limit, HH Limit, LO limit, LL limit of the alarms, importance and so forth, and they are managed for every equipment.

An alarm suppression judgment means 32 receives notification from the alarm state management means 31 every time when the alarm issuance states are varied, and reads the alarm issuance patterns from the alarm engineering DB 23. The alarm suppression judgment means 32 executes judgment whether alarm suppression is executed or not based on the alarm issuance states and alarm issuance patterns.

Judgment information of the alarm suppression judgment means 32 is conveyed to the alarm processing means 12 and the alarm processing means 12 suppresses the notification of the alarm to the alarm display means 13 if there is a suppression target alarm in the alarms to be notified.

Figure 2:
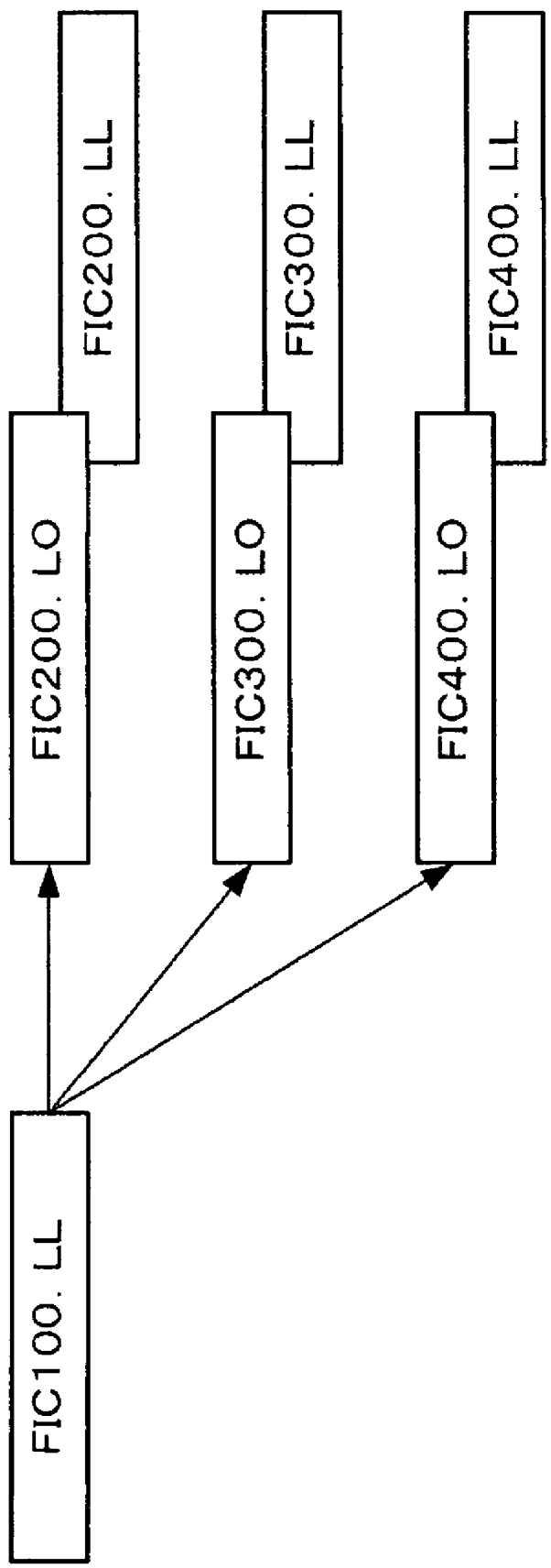
FIG. 2 is a view for explaining tailgate alarm issuance patterns.

FIG. 2 is a view for explaining tailgate alarm issuance patterns.

FIC100, FIC200 and so forth in FIG. 2 represent tags each allocated to field equipment installed in a plant. LO represents a state where a LO limit alarm is issued and LL represents a state where a LL limit alarm is issued. For example, FIC100.LL shows that the alarm state is LL (LL limit alarm) in a field equipment having a tag name of FIC100.

FIG. 2 shows in case it is comprehended in advance that LO and LL are inevitably secondarily issued as tailgate alarms even in the filed equipment having the tag name of FIC200, FIC300 and FIC400, respectively, while triggered by the issuance of FIC100 when there is issued FIC100.LL in some parts of a plant facility.

FIG. 3 is a view for explaining examples of the tailgate alarms. FIG. 3 shows a case where the alarm issuance patterns are set in a table format by the alarm engineering means 22. In this example, there is shown a state where two alarm groups of GROUP-A and GROUP-B are set.

The alarm group GROUP-A is now explained.

It is assumed that if FIC100.LL is issued, it is comprehended in advance that FIC200.LO, FIC200.LL, FIC300.LO, FIC300.LL, FIC400.LO, FIC400.LL, are secondarily issued while trigged by the issuance of FIC100.LL. In this case, these alarms are associated with each other in causes of issuance, these alarms are collectively grouped as GROUP-A. Further, since the FIC100.LL is the alarm serving as a source of causes, setting is executed in the manner that the column of trigger is marked as Yes and the alarm serving as the source of causes can be discriminated from other alarms (suppression target alarms) as a suppression condition of the tailgate alarm (trigger alarm).

Likewise, if FICA00.LL is issued, tailgate alarms that are associated with FICA00.LL in causes of issuance are grouped as GROUP-B, and the FICA00.LL serving as the source of causes is designated as the suppression condition of the tailgate alarm (hereinafter referred to as tailgate alarm suppression condition).

Meanwhile, although in this example, one alarm is set as the source of causes, not less than two alarms may be set as the sources of causes.

Figure 4:
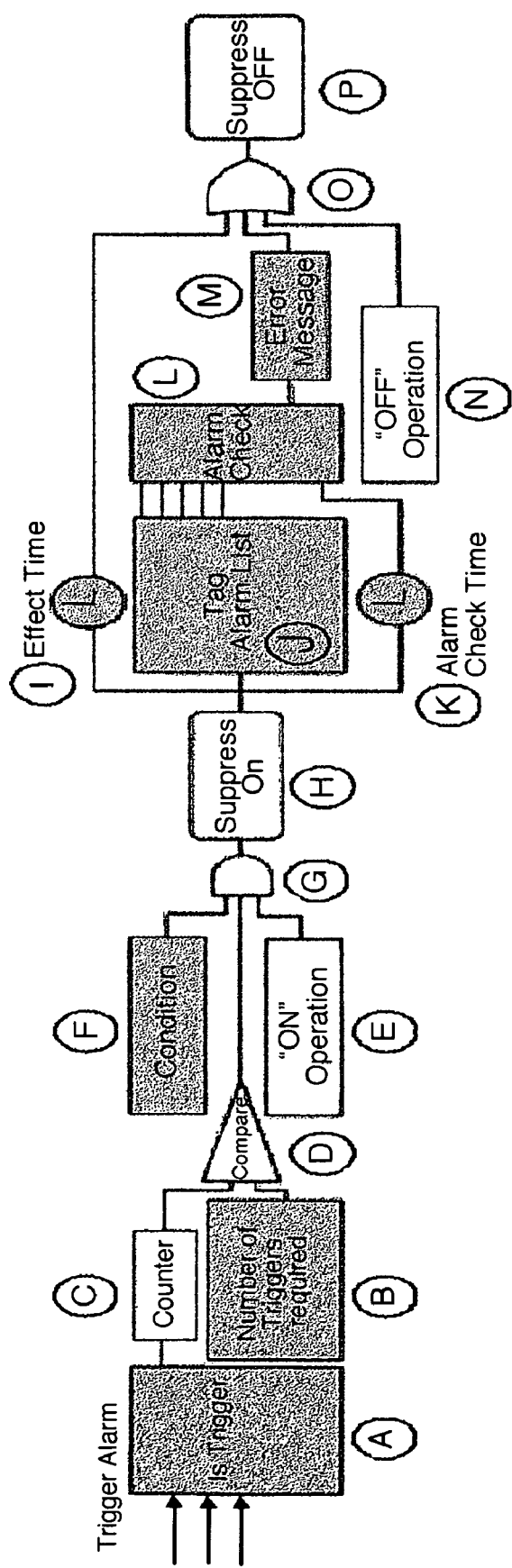
FIG. 4 is a block diagram showing a concrete configuration of the invention.

FIG. 4 is a block diagram showing a concrete configuration of the invention.

It is monitored whether a trigger alarm that is set as the tailgate alarm suppression condition is issued or not in accordance with alarm issuance states by the alarm state management means 31 (Section A).

In the example of FIG. 3, the alarm FIC100.LL in the alarm group GROUP-A, and the alarm FICA00.LL in the alarm group GROUP-B correspond to the trigger alarm, respectively.

In the example of FIG. 3, although the number of trigger alarm is set one by one for each alarm group, a multitude of tigers alarms may be set for each alarm group. For example, supposed that the alarms FIC100.LL, FIC200.LO FIC300.LO of the alarm group GROUP-A are each set as the trigger alarm, and when some of the trigger alarms are issued, it is possible to set whether the tailgate alarm suppression condition is established or not (Section B). For example, in case a tailgate alarm suppression condition is established when two trigger alarms of three trigger alarms are issued, it is set to "2".

In a counter (Section C), the number of trigger alarms that are issued for every alarm group is counted, and it is judged whether or not the number of the trigger alarm reaches a specified number (Section D).

As the tailgate alarm suppression condition, there are judgment of an operator (Section E), a processing state (Section F) of a plant, and so forth except for the issuance of a trigger alarm.

According to the judgment of the operator (Section E), a tailgate alarm suppression is normally set to ON so that it is automatically executed provided that the other conditions are established, but tailgate alarm suppression may no be forcibly executed if it is set to OFF.

Further, in the processing state (Section F) of the plant, the tailgate alarm suppression may not be executed, for example, during a start up by establishing conditions where the tailgate alarm suppression is set to OFF so as to monitor all the alarms during the start-up as the important process.

If all the tailgate alarm suppression conditions are established in such a manner (Section G), the tailgate alarm suppression is executed, so that only the alarm serving as the source of causes of issuance is notified to the operator (Section H). This will appropriately suppress unnecessary alarms, thereby easing strain on the operator during alarm operation, so that the plant can be operated with more safety.

When the tailgate alarm suppression is executed, after the elapse of a predetermined time (Section I), the tailgate alarm suppression is cancelled (Sections O, P). Provided that the tailgate alarm suppression is repetitively-executed/cancelled in the manner that once the tailgate alarm suppression is cancelled after the elapse of a predetermined time (Section I), if the suppression condition is established again, the tailgate alarm suppression is executed so that the operator can prevent oversight of the alarm due to neglect of cancellation of the tailgate alarm suppression.

Further, the alarm issuance patterns (Section J) set by the alarm engineering means 22 are compared with the alarm issuance states (Section L) actually issued after the elapse of a predetermined time (Section K). If assumed tailgate alarms are not issued in the alarm state management means 31, an error message is issued (Section M), and the tailgate alarm suppression is cancelled (Sections O, P). If the assumed tailgate alarms are not issued, setting errors of the alarm issuance patterns and issuance of unexpected states in the process are conceivable so that the operator can operate the plant with more safety by issuing an error message. The reason why the alarm issuance patterns are compared with the alarm issuance states (Section L) actually issued after the elapse of a predetermined time (Section K) is to prevent the tailgate alarm suppression from being carelessly cancelled in case there is a likelihood of delay in time from the issuance of the trigger alarm until the issuance of the tailgate alarms depending on processing states.

Still further, it is possible to forcibly cancel the alarm suppression by the judgment of the operator (Section N).

Figure 5A:
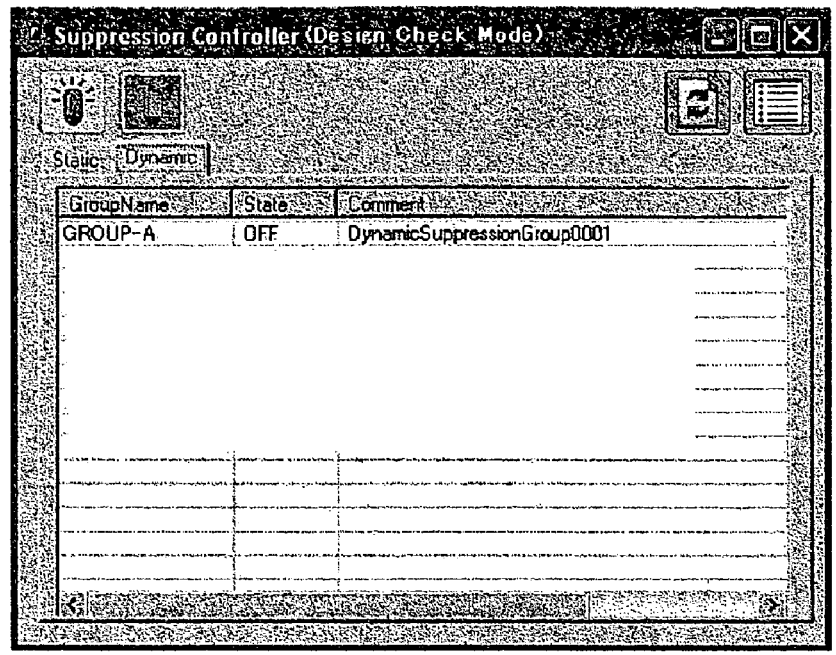
FIGS. 5(A) and 5(B) are views each showing an example of a concrete screen display of the invention.
Figure 5B:
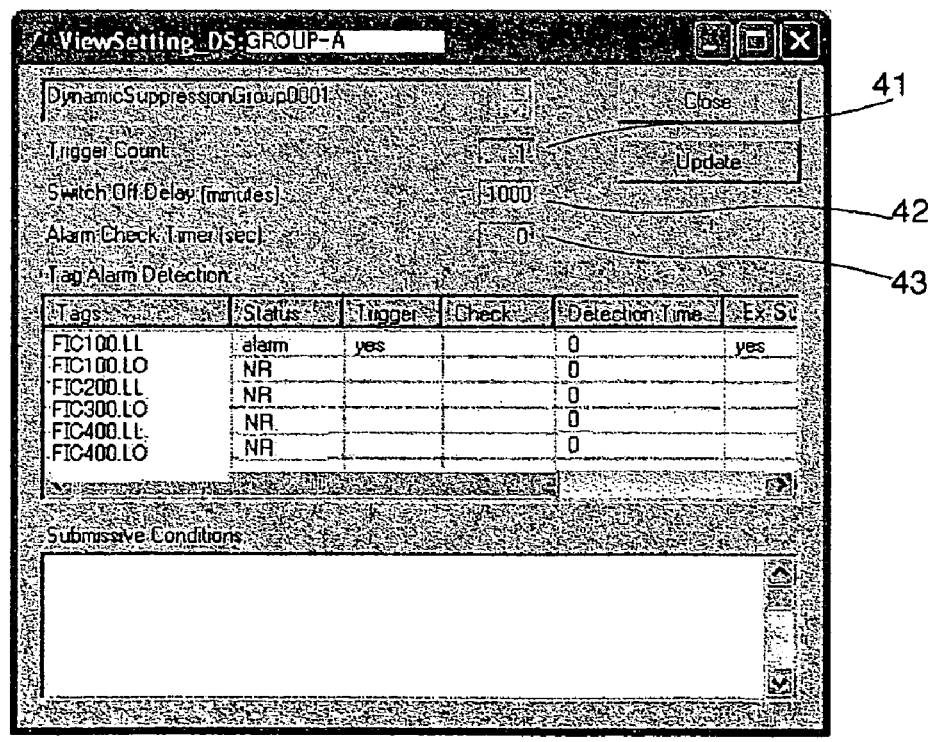

FIGS. 5(A) and 5(B) are views each showing an example of a concrete screen display of the invention.

FIG. 5(A) shows an example of a screen display for setting the alarm suppression to ON/OFF by the judgment of the operator (Sections E, N in FIG. 4).

In this example, since the tailgate alarm suppression in the GROUP-A is set to OFF, even if the trigger alarm is issued, the suppression target alarms set in the GROUP-A are not suppressed, and all the alarms set in the GROUP-A are notified to the operator.

Meanwhile, since the tailgate alarm suppression in the GROUP-A is set to ON, if the trigger alarm is issued, only the trigger alarm is notified to the operator but the suppression target alarms set in the GROUP-A are not notified to the operator.

FIG. 5(B) shows an example of a screen display for setting the alarm issuance patterns.

A trigger count 41 is provided to set whether the tailgate alarm suppression is executed or not when several trigger alarms are issued.

In this example, if one trigger alarm in GROUP-A is issued, the tailgate alarm suppression is executed.

A switch off delay 42 is provided to set a time for canceling the tailgate alarm suppression after the elapse of a predetermined time (Section I in FIG. 4).

In this example, in GROUP-A, the tailgate alarm suppression is cancelled after the elapse of 1000 minutes upon initiation of the tailgate alarm suppression.

An alarm check timer 43 is provided to set a time for confirming whether the assumed tailgate alarms are issued or not after a predetermined time in case the tailgate alarm suppression is actually executed (Section K in FIG. K).

In this example, in GROUP-A, monitoring whether the assumed tailgate alarms are actually issued is executed by the alarm issuance state of the alarm state management means 31 after 0 second upon initiation of the tailgate alarm suppression (at the same time with the initiation of suppression).

In such a manner, not only the tailgate alarms are suppressed but also the tailgate alarm suppression condition can be meticulously set so that appropriate alarms can be notified to the operator.

Further, since the suppression target alarm is judged from the alarm issuance states and alarm issuance patterns, logics for the tailgate alarm suppression can be constructed without depending on controllers, and the engineering and execution thereof can be managed with concentration.

What is claimed is:

1. An alarm management device for managing alarms issued in a plant comprising:
    alarm state management means for managing issuance states of acquired alarms,
    alarm engineering means for setting alarm issuance patterns, alarm suppression judgment means for judging suppression target alarms from the alarm issuance states and alarm issuance patterns, and
    alarm processing means for executing suppression of the suppression target alarms among the acquired alarms in response to an instruction of the alarm suppression judgment means.

2. The alarm management device according to claim 1, wherein the alarm issuance patterns group alarms that are associated with each other in causes of issuance and specifies an alarm serving as a source of causes as a suppression condition.

3. The alarm management device according to claim 2, wherein the alarm suppression judgment means monitors alarm issuance states managed by the alarm state management means, and causes alarms other than an alarm satisfying the suppression condition among the alarms of a group belonged to the suppression condition to be the suppression target alarms when the alarm satisfying the suppression condition is issued.

4. The alarm management device according to claim 1, wherein the alarm suppression judgment means monitors alarm issuance states managed by the alarm state management means, and instructs cancellation of the suppression of suppression target alarms when the suppression target alarms are not issued on schedule.

5. The alarm management device according to any claim 1, wherein the alarm processing means monitors processing states of the plant, and suppresses the suppression target alarms in response to the instruction of the alarm suppression judgment means when the processing states satisfy prescribed conditions.

* * * * *